(12) United States Patent
Merritt (10) Patent No.: US 10,682,013 B2
(45) Date of Patent: Jun. 16, 2020

(54) GRATE STACKER

(71) Applicant: Matthew H Merritt, Ponte Vedra Beach, FL (US)

(72) Inventor: Matthew H Merritt, Ponte Vedra Beach, FL (US)

(*) Notice: Subject to any disclaimer, the term of this patent is extended or adjusted under 35 U.S.C. 154(b) by 280 days.

(21) Appl. No.: 15/683,766

(22) Filed: Aug. 22, 2017

(65) Prior Publication Data

US 2018/0049589 A1   Feb. 22, 2018

Related U.S. Application Data

(60) Provisional application No. 62/377,838, filed on Aug. 22, 2016.

(51) Int. Cl.
*A47J 37/07* (2006.01)

(52) U.S. Cl.
CPC ....... *A47J 37/0786* (2013.01); *A47J 37/0763* (2013.01); *A47J 2037/0795* (2013.01)

(58) Field of Classification Search
CPC ................ A47J 37/0763; A47J 37/0786; A47J 2037/0795; F16B 7/1418
See application file for complete search history.

(56) References Cited

FOREIGN PATENT DOCUMENTS

CN        101685953       *   3/2010

* cited by examiner

*Primary Examiner* — Alfred Basichas
(74) *Attorney, Agent, or Firm* — Mark Young, PA (57) ABSTRACT

A grate stacker includes a bottom clamp assembly, and an upper clamp assembly, coupled by an intermediate support shaft assembly extending from the middle of the top of the bottom clamp assembly to the bottom of the upper clamp assembly. The support shaft assembly allows pivoting rotation of the upper clamp assembly relative to the bottom clamp assembly. Each clamp assembly attaches to a grate of a barbecue to support the grates in stacked relationship, while enabling pivoting motion of the upper grate relative to the lower grate. An optional anchor prevents the bottom grate from tipping.

20 Claims, 13 Drawing Sheets

DETAIL A

GRATE STACKER

RELATED APPLICATION

This application is a non-provisional of and claims the benefit of priority of U.S. Provisional Application 62/377,838 filed Aug. 22, 2016, the entire contents of which are incorporated herein by this reference.

FIELD OF THE INVENTION

This invention relates generally to barbecues, and, more particularly, to a grate stacker for supporting a plurality of barbecue grills in a stacked configuration.

BACKGROUND

Traditionally, the mushikamado (a Japanese barbecue grill, aka kamado grill) was comprised of a round clay pot with a removable domed clay lid. Modern commercial embodiments of such grills, which have grown immensely in popularity in recent years, are now made from a variety of materials including high fire ceramics and refractory materials with a high gloss ceramic glaze on the outer surfaces.

As the popularity of mushikamado-style grills has skyrocketed, so too has the market for accessories. Among the accessories are stackable grills and structures (grill stackers) for supporting grills in stacked configuration. While known grill stackers enable additional cooking surfaces, they suffer shortcomings. Many do not enable the upper grill to easily pivot out of the way of the lower grill. Many do not account for strain on the upper grill or for downward pitch caused by the weight of food and play in the support. Many do not account for the potential for tipping of the assembly due to weight of the food on the upper grill when extended outwardly.

An improved grill stacker is needed. The improved grill stacker should allow pivoting of the upper grill, canting of the upper grill to offset downward pitch, and optional anchoring to prevent tipping.

The invention is directed to overcoming one or more of the problems and solving one or more of the needs as set forth above.

SUMMARY OF THE INVENTION

To solve one or more of the problems set forth above, in an exemplary implementation of the invention, a grate stacker includes a bottom clamp assembly, and an upper clamp assembly, coupled by an intermediate support shaft assembly extending from the middle of the top of the bottom clamp assembly 105 to the bottom of the upper clamp assembly. The support shaft assembly allows pivoting rotation of the upper clamp assembly relative to the bottom clamp assembly. Each clamp assembly attaches to a grate of a barbecue to support the grates in stacked relationship, while enabling pivoting motion of the upper grate relative to the lower grate. An optional anchor prevents the bottom grate from tipping. The anchor attaches to the bottom grill and either exerts pressure against a structure of the barbecue to resist tipping or attaches to the structure of the barbecue to resist tipping.

In one embodiment, a grate stacker according to principles of the invention includes a bottom clamp assembly, including a first clamping member, a second clamping member, and a first mechanism urging the first clamping member towards the second clamping member; and an upper clamp assembly, including a third clamping member, a fourth clamping member, and a second mechanism urging the third clamping member towards the fourth clamping member; and an intermediate support assembly extending from the bottom clamp assembly to the upper clamp assembly, the intermediate support assembly maintaining the bottom clamp assembly spaced apart from the upper clamp assembly. The first clamping member is disposed below the second clamping member and the third clamping member is disposed below the fourth clamping member. The first mechanism may be a first screw extending through the first clamping member and second clamping member. The second mechanism may be a second screw extending through the third clamping member and fourth clamping member. Tightening the screws exerts clamping force, urging the clamping members together.

In one embodiment, the third clamping member is pitched upwardly at an acute angle relative to horizontal, the acute angle being up to 15°. In another embodiment, the third clamping member includes a base and a leading edge pitched upwardly at an acute angle relative to horizontal, the acute angle being up to 15°. In another embodiment, the third clamping member includes a base, a leading edge, and a shim extending upwardly (up to about 0.5 inches) at the leading edge.

In one embodiment, the intermediate support includes a top intermediate support and a bottom intermediate support rotatable relative to the top intermediate support. The intermediate support may be a lead screw, with a rod having external threads and a sleeve having internal threads. In this embodiment, a portion of the rod is threadedly received in the sleeve.

Using a grate stacker according to principles of the invention, a pair of grates for a grill may be stacked (supported), one above the other, with the bottom clamp assembly clamping a bottom grate, while the upper clamp assembly clamps a top grate, and the intermediate support assembly extends from the bottom clamp assembly to the upper clamp assembly and maintains the bottom clamp assembly spaced apart from the upper clamp assembly, with the top grate spaced apart from the bottom grate. As the intermediate support assembly includes a lower intermediate support and an upper intermediate support that is rotatable relative to the lower intermediate support, the top grate may be pivoted away from the bottom grate. Additionally, because the upper clamp assembly includes a bottom clamp member that is pitched, or equipped with a pitched leading edge, or equipped with a shim at the leading edge, the upper clamp assembly supports the top grate in an upwardly pitched configuration to offset downward deflection from the weight of food and play in the intermediate support.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

In an exemplary implementation of the invention, a grate stacker includes a bottom clamp assembly, and an upper clamp assembly, coupled by an intermediate support shaft assembly extending from the middle of the top of the bottom clamp assembly to the bottom of the upper clamp assembly. The support shaft assembly allows pivoting rotation of the upper clamp assembly relative to the bottom clamp assembly. Each clamp assembly attaches to a grate of a barbecue to support the grates in stacked relationship, while enabling pivoting motion of the upper grate relative to the lower grate. An optional anchor prevents the bottom grate from tipping. The anchor attaches to the bottom grill and either exerts pressure against a structure of the barbecue to resist tipping or attaches to the structure of the barbecue to resist tipping.

While a grate stacker according to principles of the invention works well with kamado grills, it is not limited to use with such grills. Rather, a grate stacker according to principles of the invention may be used with kettle grills and other grills that may accommodate stacked grates, whether or not the grates have circular plan shapes.

Figure 1:
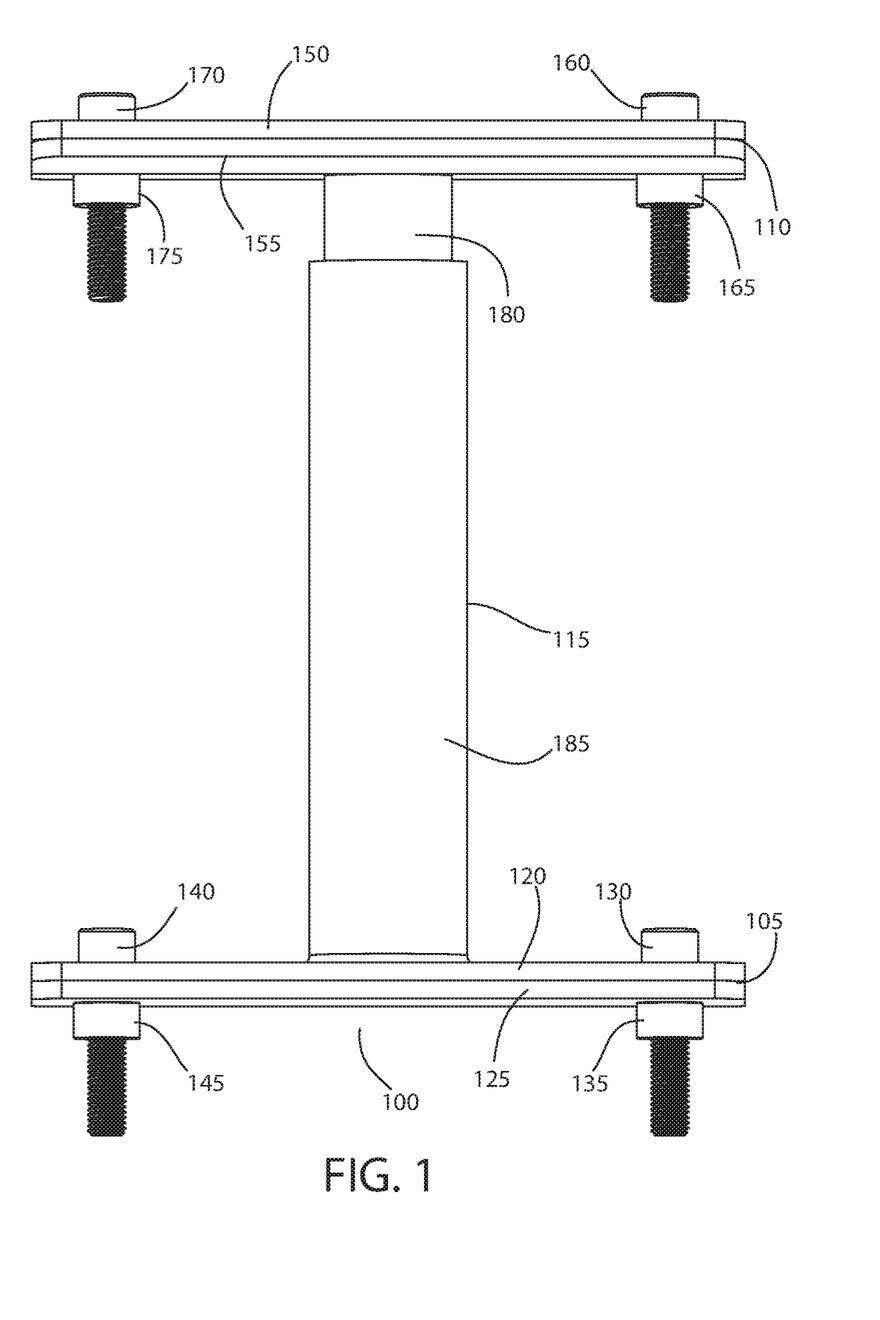
FIG. 1 is a front view of an exemplary grate stacker assembly according to principles of the invention.

Referring to FIG. 1, an exemplary grate stacker 100 according to principles of the invention includes a bottom clamp assembly 105 and an upper clamp assembly 110, coupled by an intermediate support shaft assembly 115 extending from the middle of the top of the bottom clamp assembly 105 to the bottom of the upper clamp assembly 110. The support shaft assembly 115 allows pivoting rotation of the upper clamp assembly 110 relative to the bottom clamp assembly 105.

The upper clamp assembly 110 clamps a grate (i.e., grill) between an upper plate 150 and a lower plate 155. The intermediate support shaft assembly 115 extends downwardly orthogonal from the bottom side of the lower plate 155. The clamped portion of the grate is sandwiched between the upper plate 150 and a lower plate 155. As discussed in more detail below, the upper clamp assembly 110 pitches the clamped grate horizontally or at a slight acute angle relative to the horizontal, after accounting for play in the intermediate support shaft assembly 115. In this manner, food (including heavy food) on the grate clamped by the upper clamp assembly 110 will not slide off the grate.

A pair of screws 160, 170 extend through apertures in the plates 150, 155 of the upper clamp assembly 110, and through spaces between supported rods of the clamped grate, and thread into mating sleeves 165, 175 to draw the upper plate 150 against the lower plate 155. The sleeves 165, 175 may be attached to the underside of the lower plate 155. Nuts, whether attached to the lower plate 155 or separate from the lower plate 155 may be used in lieu of the sleeves 165, 175. Alternatively, the apertures in the lower plate 155 may be threaded, rendering unnecessary the sleeves 165, 175 and nuts.

The lower clamp assembly 105 clamps a grate (i.e., grill) between an upper plate 120 and a lower plate 125. The clamped portion of the grate is sandwiched between the upper plate 120 and a lower plate 125. The intermediate support shaft assembly 115 extends upwardly, vertically, orthogonal from the top side of the upper plate 120.

A pair of screws 130, 140 extend through apertures in the plates 120, 125 of the lower clamp assembly 105, and through spaces between support rods of the clamped grate, and thread into mating sleeves 135, 145 to draw the upper plate 120 against the lower plate 125. The sleeves 135, 145 may be attached to the underside of the lower plate 125. Nuts, whether attached to the lower plate 125 or separate from the lower plate 125 may be used in lieu of the sleeves 135, 145. Alternatively, the apertures in the lower plate 125 may be threaded, rendering unnecessary the sleeves 135, 145 and nuts.

The intermediate (vertical) support shaft assembly 115 includes a lower tube 185 and an upper tube 180. The inner diameter of the lower tube 185 is slightly greater than the outer diameter of the upper tube 180, allowing the lower tube 185 to receive the inner tube 180, and further allowing the upper tube 180 to rotate relative to the lower tube 185.

The length of the lower tube 185 is less than the length of the upper tube 180, allowing the upper tube 180 to extend upwardly beyond the upper edge of the lower tube 185. The lower tube 185 is hollow. The upper tube 180 may be solid (e.g., a solid rod) or hollow.

The invention is not limited to the exemplary tubular support assembly. Other rotating vertical supports may be used within the spirit and scope of the invention, including a threadedly engaging tubular support (e.g., a threaded upper shaft threadedly received in a lower threaded sleeve), which allows rotation and height adjustment, as well as a support with a bearing assembly to facilitate rotation.

Figure 14:
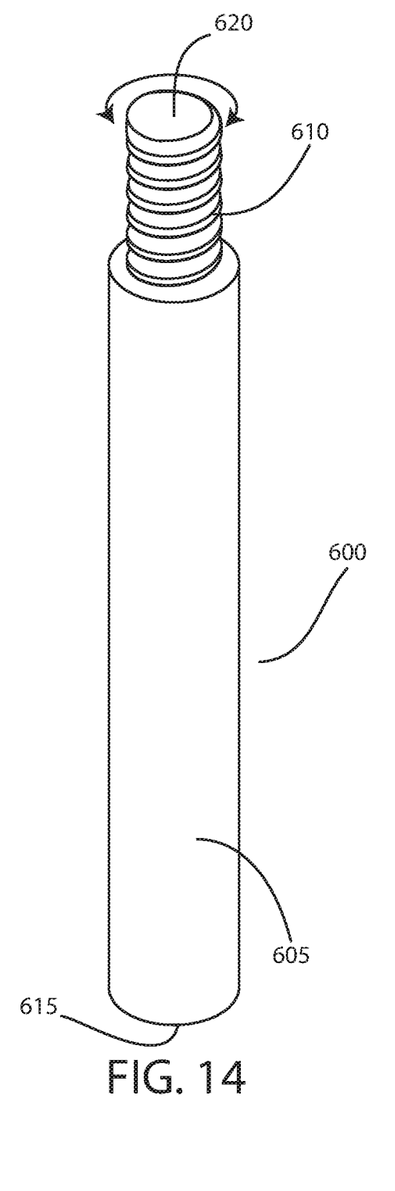
FIG. 14 is a perspective view of an exemplary threaded vertical support for use with an exemplary grate stacker assembly according to principles of the invention.
Figure 15:
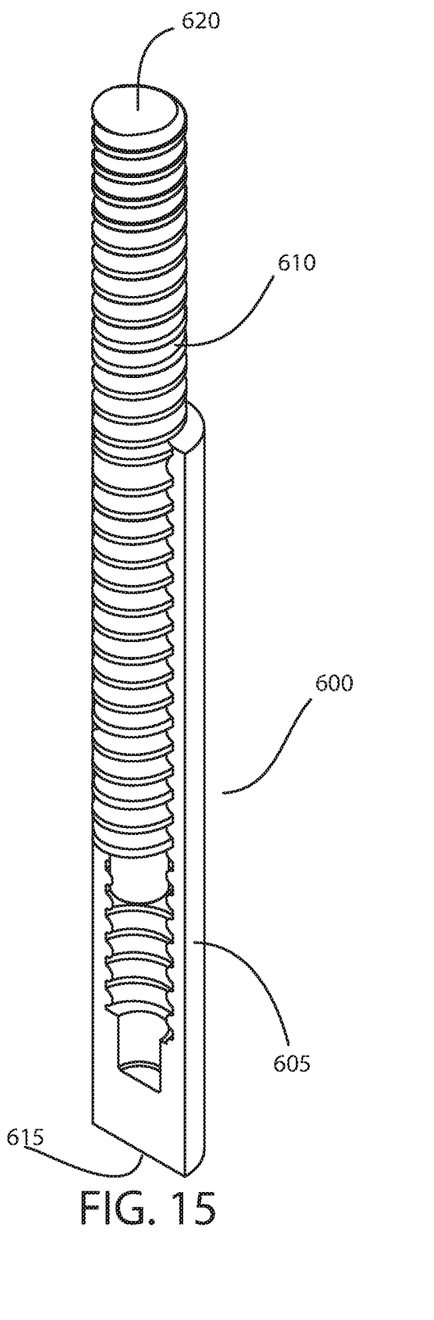
FIG. 15 is a perspective view of an exemplary threaded vertical support, with a section view showing internal threads for use with an exemplary grate stacker assembly according to principles of the invention.

With reference to FIGS. 14 and 15, an exemplary lead screw support assembly 600 includes an internally threaded sleeve 605 and a corresponding threaded (externally threaded) rod 610 to translate rotational motion into linear motion. The sleeve 605 receives the rod 610. Rotation of the rod 610 in one direction relative to the sleeve 605, extends the rod 610 from the sleeve 605. Rotation of the rod 610 in the opposite direction relative to the sleeve 605, retracts the rod 610 into the sleeve 605. The rod 610 includes a free end 620 for attachment to either the top surface of the upper plate 120 of the lower clamp assembly 105 or the bottom surface of the lower plate 155 of the upper clamp assembly 110. Likewise, the sleeve 605 includes a free end 615 for attachment to either the top surface of the upper plate 120 of the lower clamp assembly 105 or the bottom surface of the lower plate 155 of the upper clamp assembly 110, opposite the free end 620 of the rod 610. Such attachments of the free ends 615, 620 may be by welding, bonding, threaded engagement, press fitting or other mechanical fastening.

As discussed above, the upper clamp assembly 110 pitches the clamped grate horizontally or at a slight acute angle relative to the horizontal, after accounting for play in the intermediate support shaft assembly 115. Play in the intermediate support shaft assembly 115 exists due to the difference in the inner diameter of the lower tube 185 and the outer diameter of the upper tube 180. Concomitantly, pitching the clamped grate at a slight acute angle relative to the horizontal offsets bending (strain) on the upper grate due to the weight of supported food. To achieve a desired pitch, in an exemplary implementation, the bottom plate 155 of the upper clamp assembly 110 is not planar. Rather it includes a pitched (upwardly angled or curved) leading edge 157 extending from a planar base 156. The leading edge 157 and planar base 156 may be integrally formed by bending a planar plate, or separate components welded together.

Figure 2:
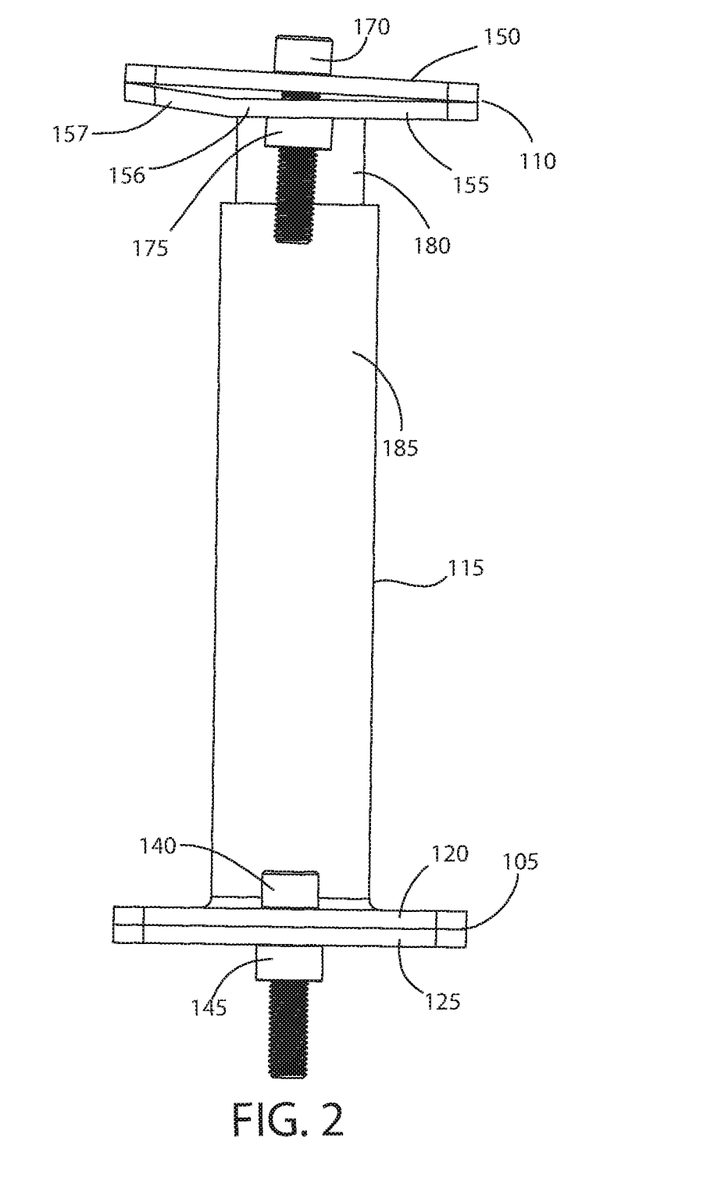
FIG. 2 is a side view of an exemplary grate stacker assembly according to principles of the invention.
Figures 3, 4:
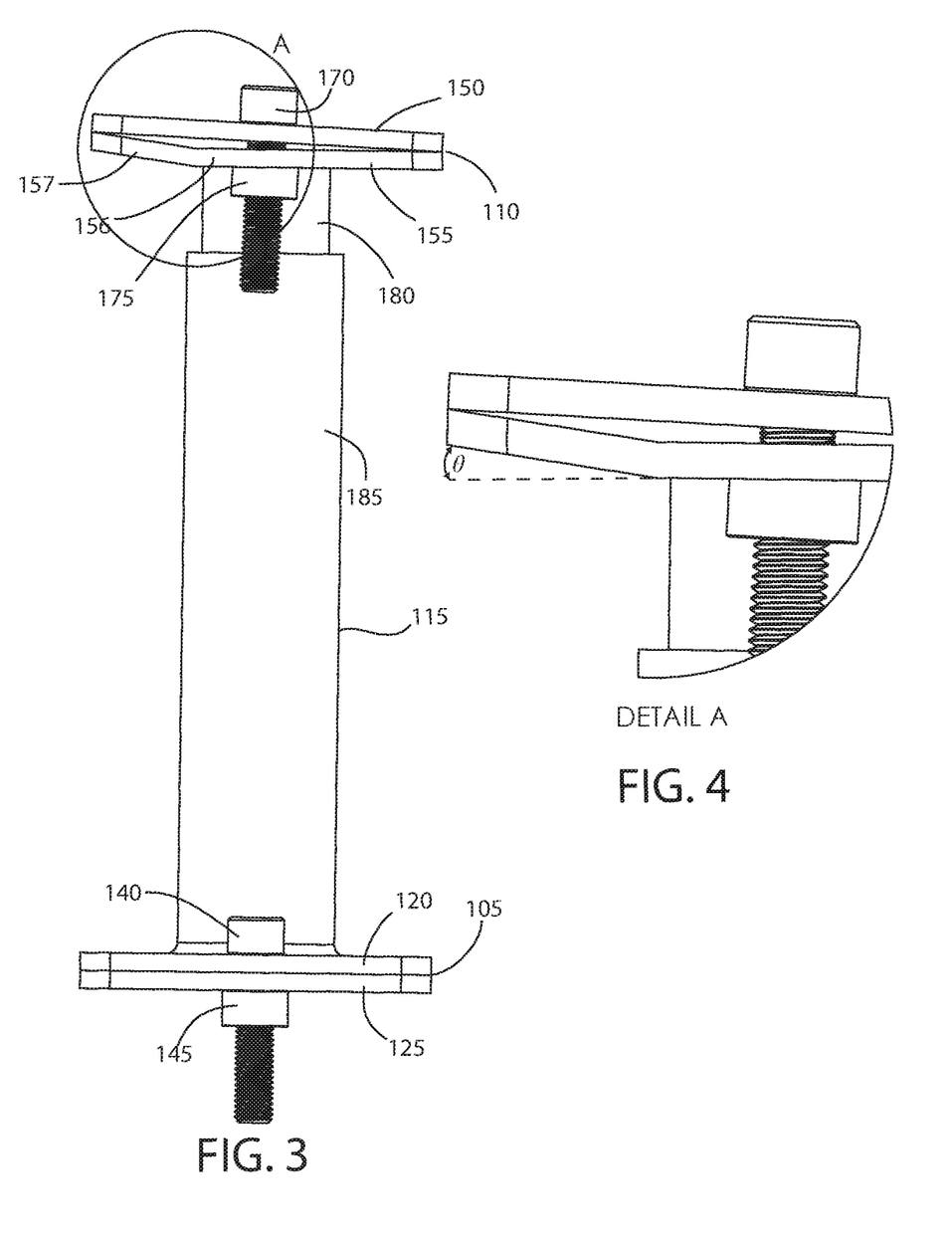
FIG. 3 is another side view of an exemplary grate stacker assembly according to principles of the invention.
FIG. 4 is a magnified side view of a leading edge portion of an exemplary grate stacker assembly according to principles of the invention.

With reference to the side views of FIGS. 2 through 4, the lower plate 155 of the upper clamp assembly 110 includes an upwardly pitched leading edge 157 extending from a generally planar base 156. The upwardly pitched leading edge 157 may be formed by bending a plate 155 or by welding the leading edge 157 to the base 156 at a desired angle. The upward pitch offsets any downward dipping due to play in the support shaft assembly 115. The upward pitch may also offset downward bending (strain) of a supported upper grate caused by the weight of food on the grate. The pitch angle $\theta$ (relative to horizontal) is acute, in some embodiment not greater than 15°, in another embodiment not greater than 10°, and in another embodiment not greater than 5°.

The invention is not limited to use of an upwardly pitched leading edge. Features other than an upwardly pitched leading edge may be used to upwardly pitch the upper grate. Such other features may include an upward flange or protrusion near the leading edge, or an angled generally planar bottom plate 155.

Figure 16:
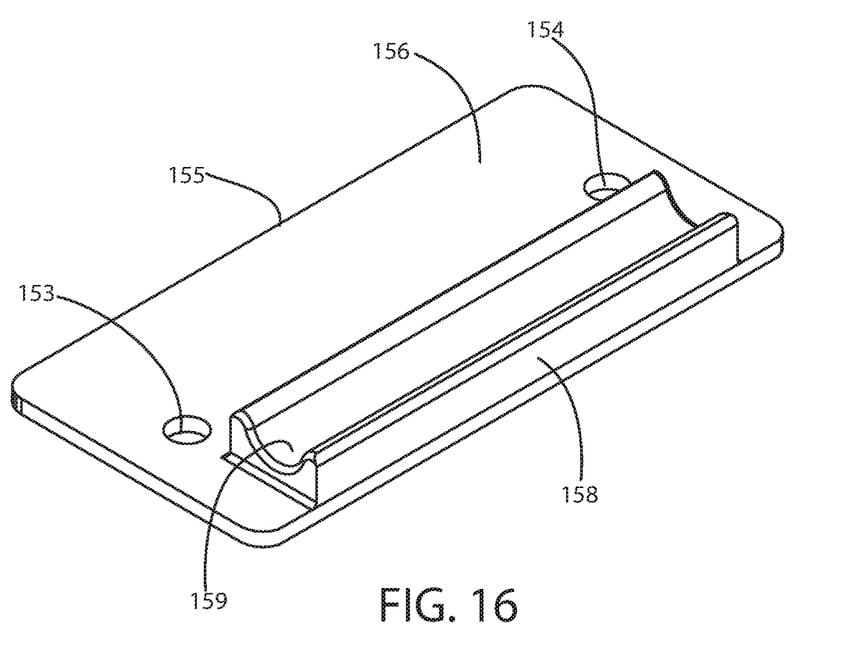
FIG. 16 is a perspective view of an exemplary alternative lower plate for an upper clamp assembly for use with an exemplary grate stacker assembly according to principles of the invention.

In another embodiment, the leading edge may include an upward lip or shim 158, as illustrated in FIG. 16. The exemplary shim includes a raised shim 158 extending from the top surface of the bottom plate 155. The exemplary shim 158 includes a channel 159 for receiving a portion of a bar of a grate. The channel 159 has a semicircular cross section, with a diameter at least as great as the width (diameter) of a bar of a grate. The height to which the shim 158 and channel 159 extend determines the pitch angle $\theta$ of the held grate.

Figure 17:
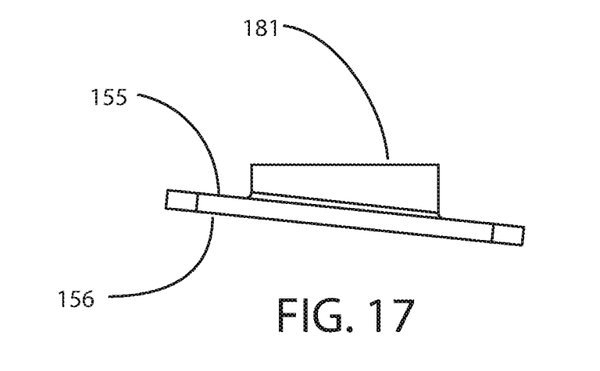
FIG. 17 is a side view of another exemplary alternative lower plate for an upper clamp assembly for use with an exemplary grate stacker assembly according to principles of the invention.
Figure 18:
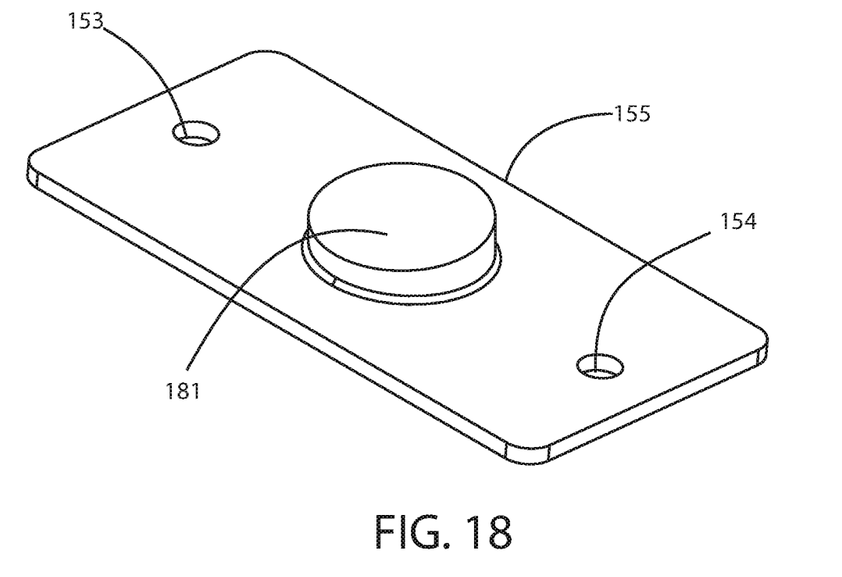
FIG. 18 is a perspective view of an exemplary alternative lower plate for an upper clamp assembly for use with an exemplary grate stacker assembly according to principles of the invention.

In yet another embodiment, as illustrated in FIGS. 17 and 18, the entire bottom plate 155 of the upper clamp assembly 110 may be generally planar and angled at an acute angle relative to the horizontal to achieve the desired pitch. A mounting disc 181 with an angled mounting surface extends from the bottom of the bottom plate 155. The top of the intermediate support shaft assembly 115 attaches to the mounting disc 181. Such attachment may be by threads, mechanical fastener, bonding or welding.

Figure 5:
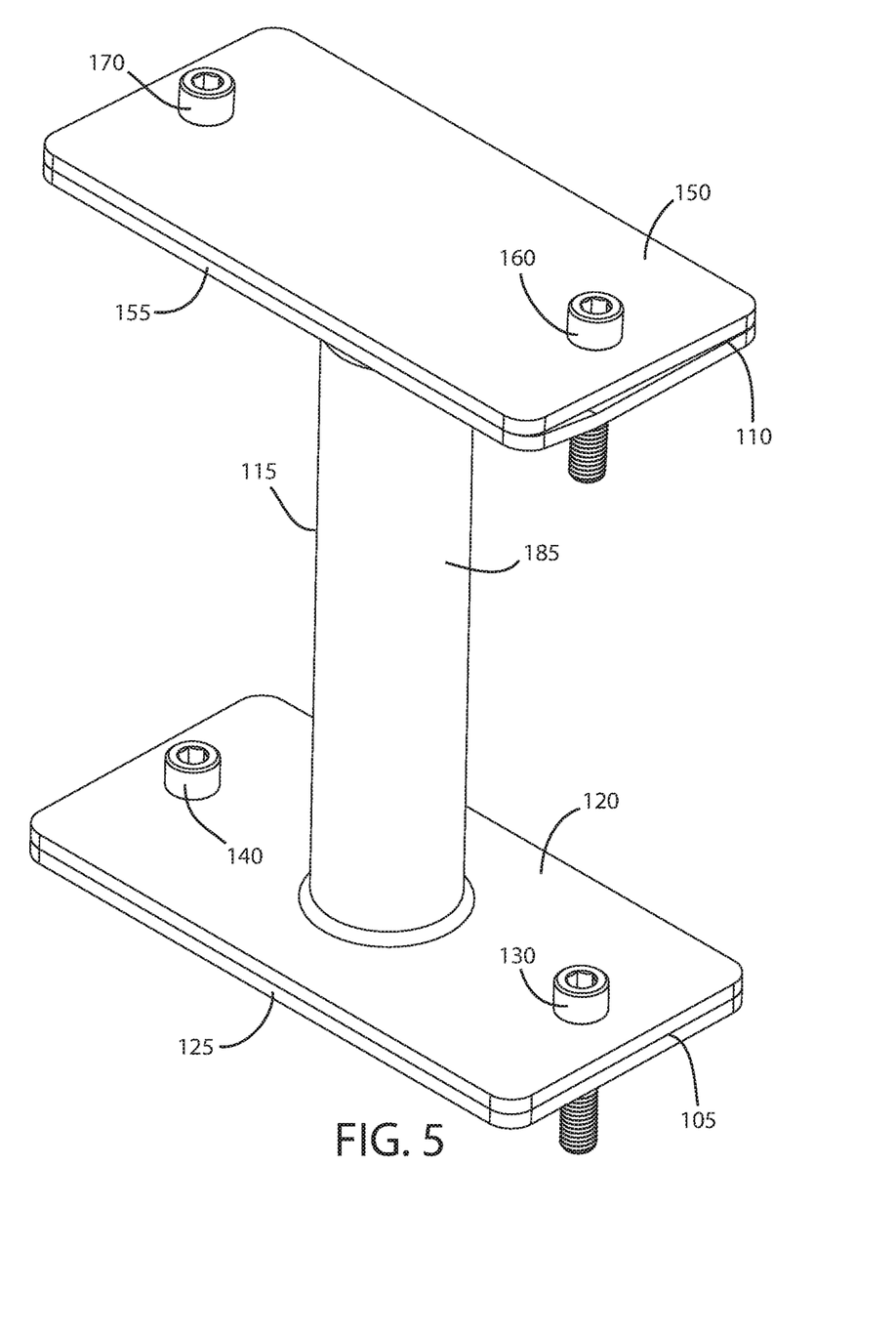
FIG. 5 is a perspective view of an exemplary grate stacker assembly according to principles of the invention.
Figure 6:
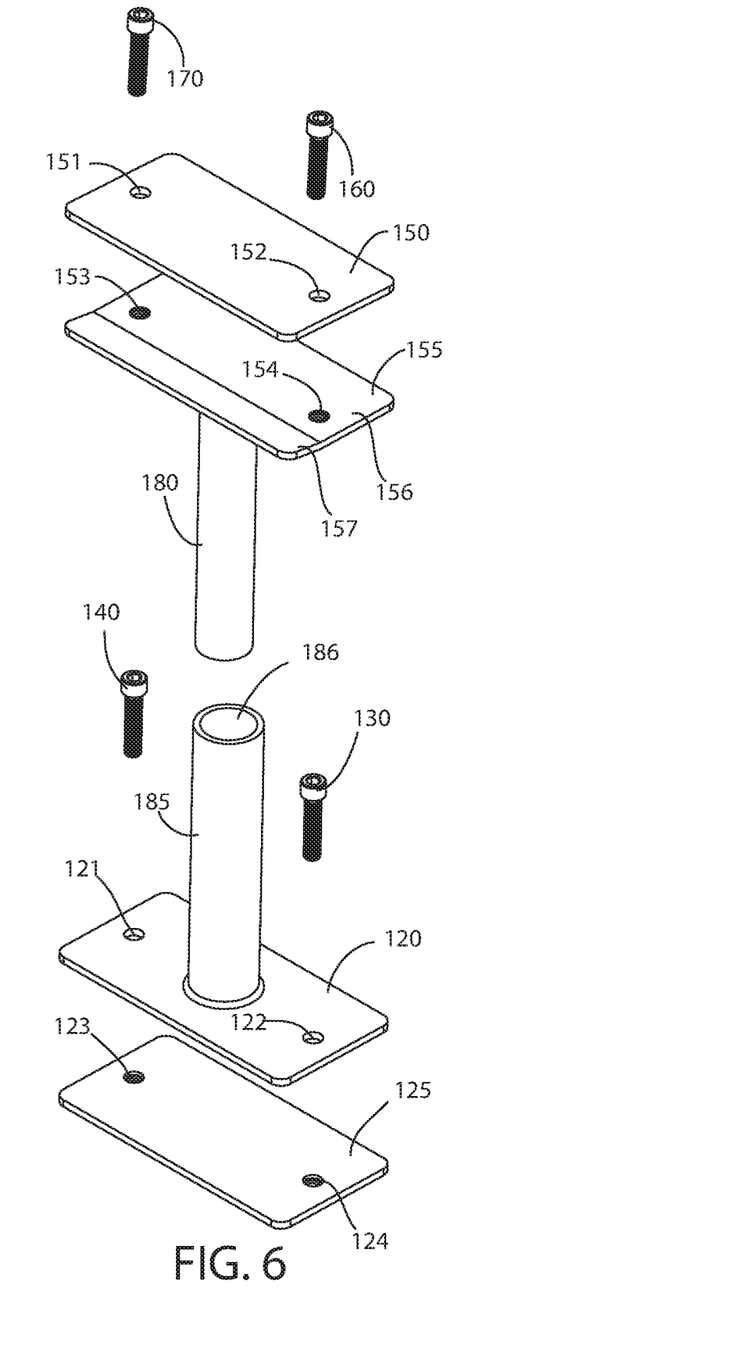
FIG. 6 is an exploded perspective view of an exemplary grate stacker assembly according to principles of the invention.

With reference to FIGS. 5 and 6, the grate stacker 100 may be readily assembled and disassembled by hand. A portion of a top grate may be sandwiched between the upper plate 150 and lower plate 155 of the upper clamp assembly 110. The majority of the grate extends outwardly and away from the leading edge 157. The screws 130, 140 extend through apertures 121, 122 in the upper plate 150, through apertures or spaces in the supported grate, through apertures 123, 124 in the lower plate 155, and thread into the threaded sleeves 165, 175 beneath the lower plate 155. The upper tube 180 slides into the hollow central channel 186 of the lower tube 185. A portion of a bottom grate may be sandwiched between the upper plate 120 and lower plate 125 of the lower clamp assembly 105. The screws 130, 140 extend through apertures 121, 122 in the upper plate 120, through spaces in the supporting grate, through apertures 123, 124 in the lower plate 125, and thread into the threaded sleeves 135, 145 beneath the lower plate 125.

Figure 7:
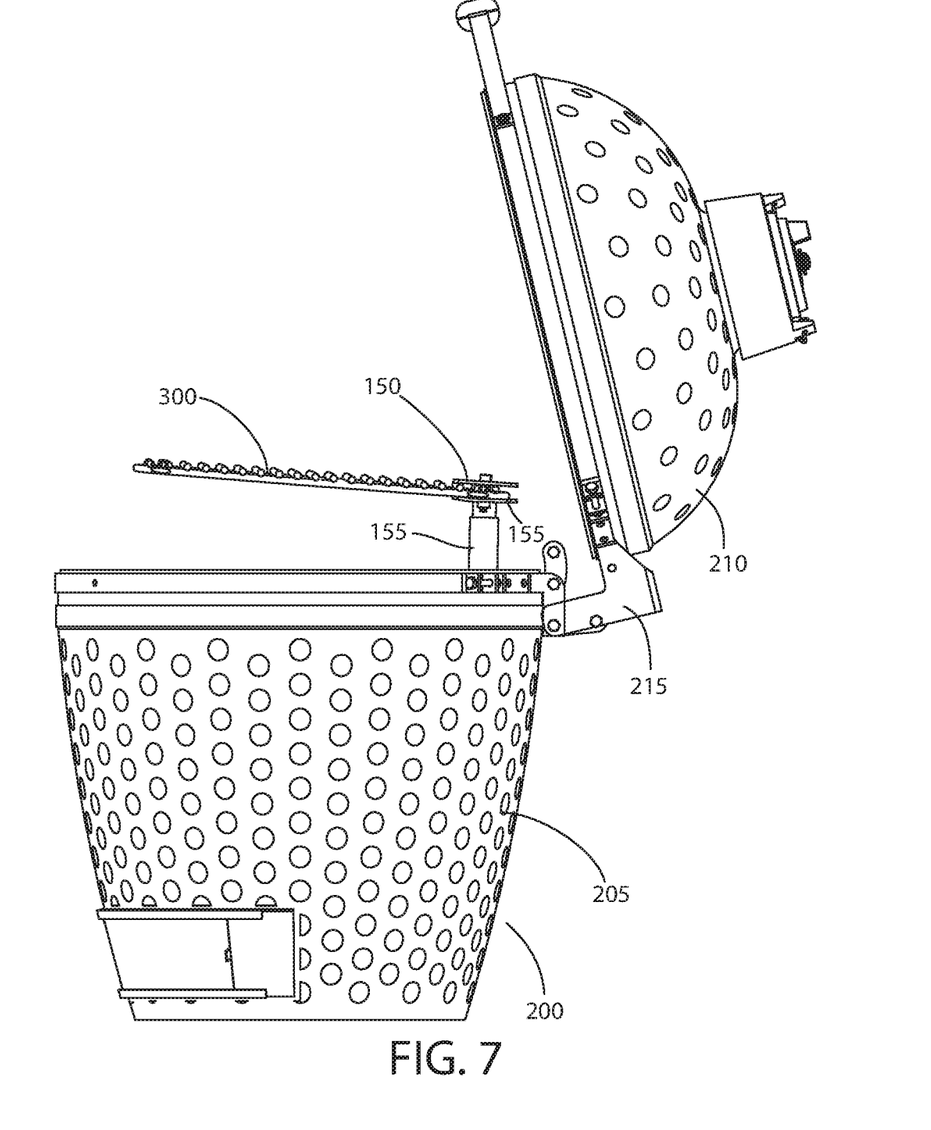
FIG. 7 is a side view of an exemplary grate stacker assembly installed in an exemplary barbecue according to principles of the invention.
Figure 8:
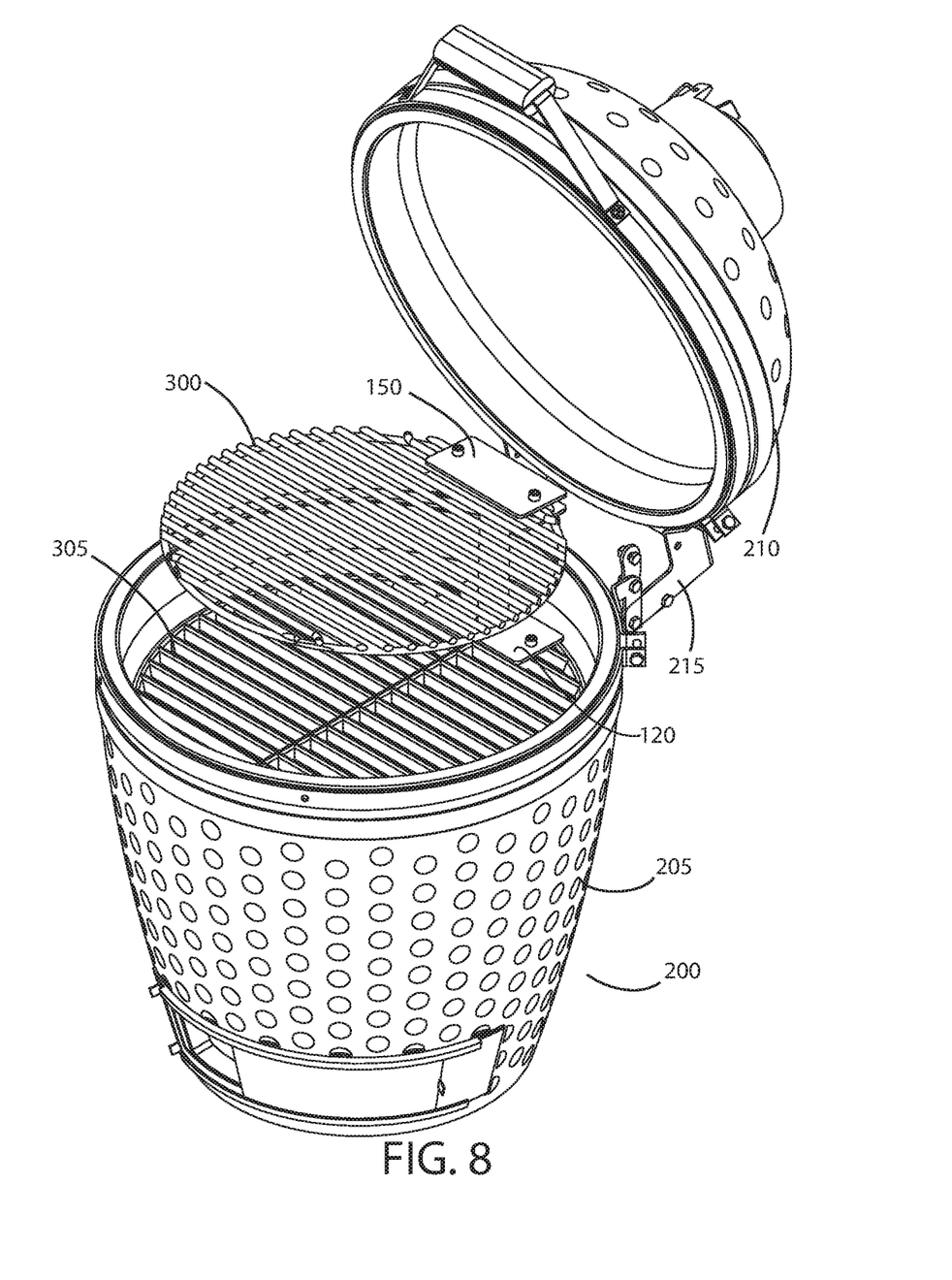
FIG. 8 is a perspective view of an exemplary grate stacker assembly installed in an exemplary barbecue according to principles of the invention.
Figure 9:
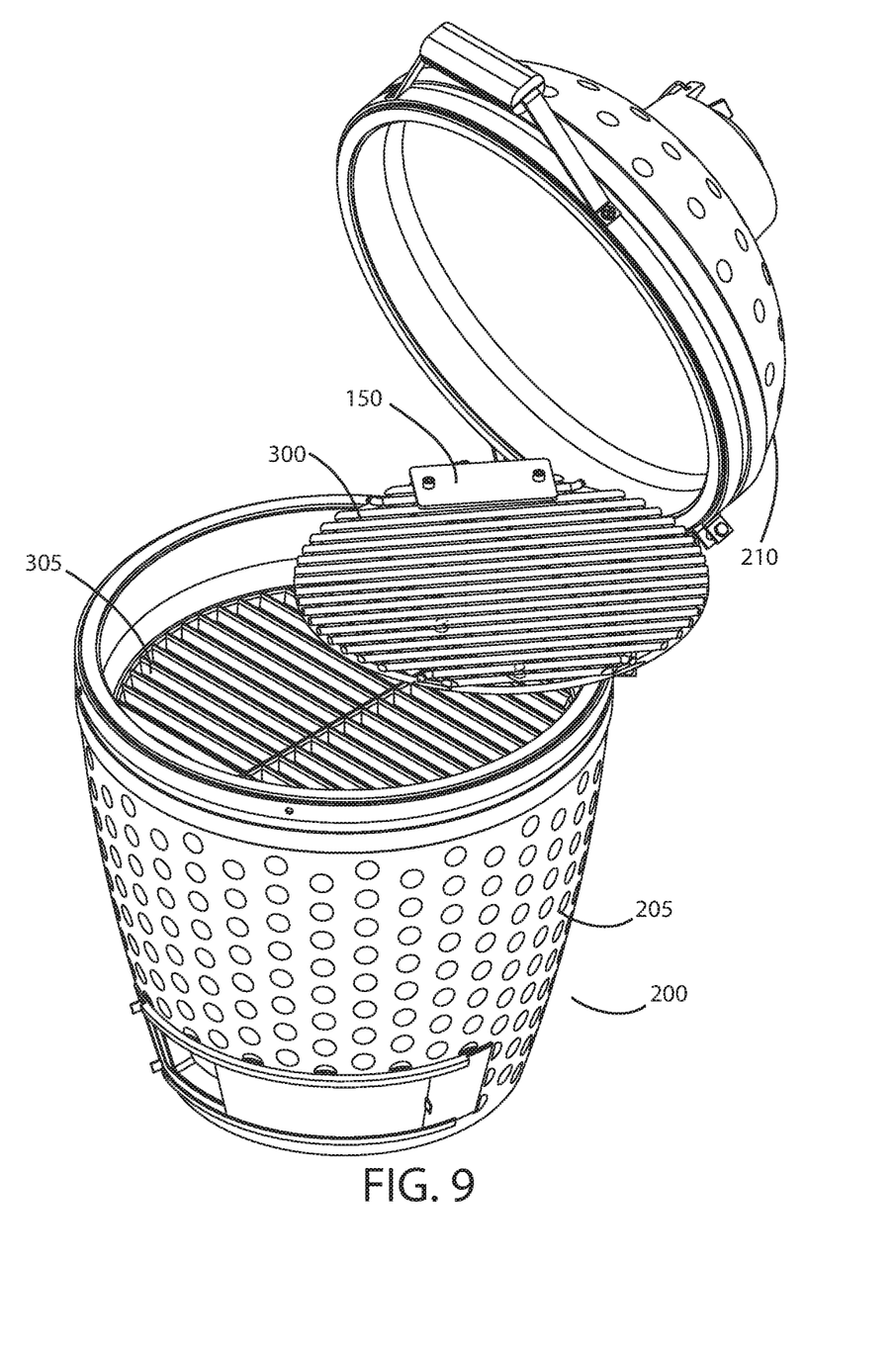
FIG. 9 is another perspective view of an exemplary grate stacker assembly installed in an exemplary barbecue according to principles of the invention.

With reference to FIGS. 7 through 9, the grate stacker 100 is conceptually illustrated in use on a grill, supporting grates 300, 305 in stacked configuration. The particular configuration of the grates 300, 305 is not important, provided that the grates include apertures or spaces to allow passage of the screws 130, 140, 160, 170, and are not excessively thick, beyond the available length of the screws. The grates should be sized to fit within the base 205 and lid 210 of the barbecue 200, when the lid is pivoted closed using the hinge 215. A typical grate is comprised of parallel spaced apart bars joined together by other bars extending across the bottom surfaces of the parallel bars. The upper grate 300 may be oriented with the parallel bars being orthogonal to, or parallel to, or an axis extending through the centers of the screws 160, 170.

As illustrated in FIG. 9, the top grate 300 may pivot relative to the bottom grate 305. The grate stacker 100 is shown adjacent to the hinge 215 of the barbecue, but may also be oriented away from the hinge 215 to provide a much greater range of pivoting motion of the top grate 300 relative to the bottom grate 305.

When the top grate 300 is fully pivoted 180°, as far away from the bottom grate 305 as it can pivot, the weight of food on the top grate 300, may cause the bottom grate 305 to tip. To resist tipping and/or anchor the bottom grate 305, an anchor may be attached to the bottom grate 305. By way of example and not limitation a wire or cable may be wrapped around the end of the bottom grate 305 opposite the grate stacker 100 and also around the annular ceramic fire ring or other available structure of the barbecue below the bottom grate in the barbecue.

Figure 10:
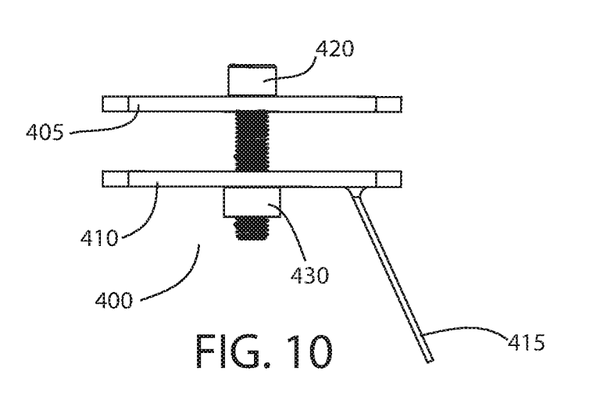
FIG. 10 is side view or an exemplary spring clamp for use with an exemplary grate stacker assembly according to principles of the invention.
Figure 11:
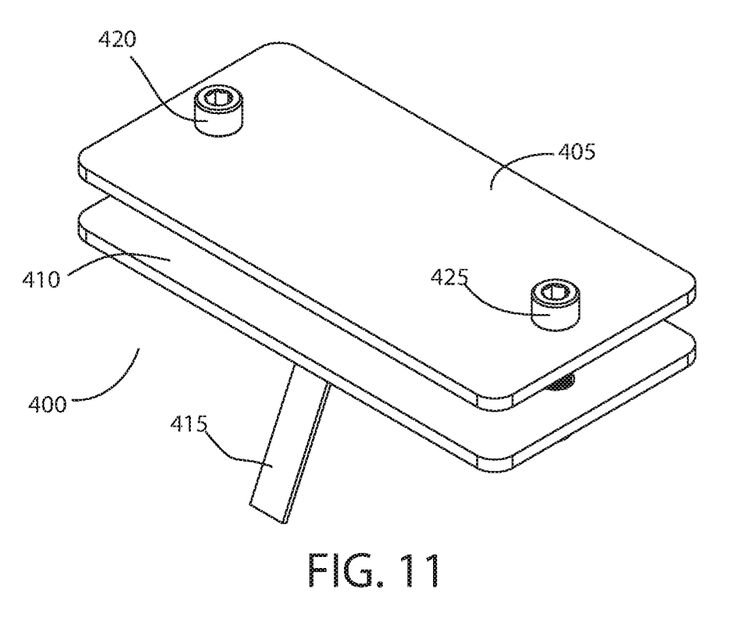
FIG. 11 is perspective view or an exemplary spring clamp for use with an exemplary grate stacker assembly according to principles of the invention.

Alternatively, with reference to FIGS. 10 and 11, a spring clamp 400 may be attached to the end of the bottom grate 305 opposite the grate stacker 100. The spring clamp 400 includes an oblique leaf spring 415 that will press against the annular ceramic fire ring or other available structure of the barbecue below the bottom grate 305 to resist tipping. The spring clamp attached using a pair of plates 405, 410, screws 420, 425, and threaded sleeves 430, in a manner similar to attachment of the bottom clamp assembly 105.

In another embodiment, the bottom end of the leaf spring 415 may include a flange that can be pinned beneath the annular ceramic fire ring or other available structure of the barbecue below the bottom grate 305. Thus the spring 415 may urge the flange under the annular ceramic fire ring.

Figure 12:
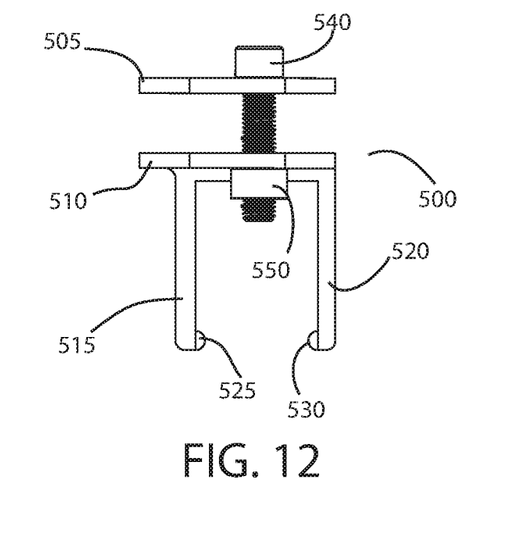
FIG. 12 is side view or an exemplary U clamp for use with an exemplary grate stacker assembly according to principles of the invention.
Figure 13:
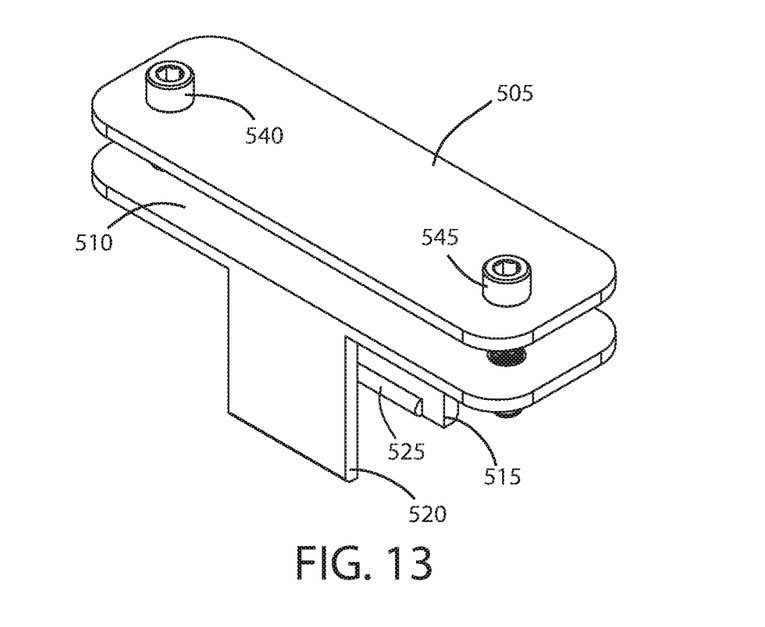
FIG. 13 is perspective view or an exemplary U clamp for use with an exemplary grate stacker assembly according to principles of the invention.

As another alternative, with reference to FIGS. 12 and 13, a U-clamp 500 may engage the edge of the annular ceramic fire ring or other available structure of the barbecue below the bottom grate 305 to resist tipping. The U-clamp includes a downwardly extending spaced apart pair of clamping arms 515, 520, which may include gripping protrusions 525, 530 or teeth. The arms 515, 520, which may be rigid or somewhat flexible (e.g., spring steel), are sized and position to securely receive the top edge of the annular ceramic fire ring or other available structure of the barbecue below the bottom grate 305. The exemplary U-clamp assembly 500 include upper 505 and lower 510 clamping plates for attachment to the lower grill with attachments such as screws 540, 545 and nuts 550 or threaded collars.

The edge(s) of the spring clamp or U-clamp that contact(s) the barbecue structure may be covered with a high temperature gasket material, to resist slipping while preventing marring. Such high temperature material may comprise ceramic cloth, aluminized fiberglass cloth, vermiculite treated fiberglass cloth, PTFE coated fiberglass film, ceramic paper, neoprene coated fiberglass cloth, silicone rubber sheeting, ceramic cloth, silicone coated fiberglass, fiberglass, silica cloth, Aramid/fiberglass cloth, Viton® coated fiberglass, twisted ceramic fiber rope, twisted Aramid fiber rope, or any other non-marring material capable of withstanding the cooking temperatures and suitable for attachment to or coating on a spring.

The grate stacker and the anchor may be comprised of metallic materials, such as but not limited to steels, including stainless steel. Any metallic material capable of withstanding cooking temperatures, suitable for use in contact with food, and exhibiting sufficient structurally integrity to support grates in stacked configuration with heavy (e.g., 20 pounds or more) food, may be used. Manufacturing techniques for such materials, including but not limited to bending, machining, cutting, welding, riveting, casting, and forging may be utilized to fabricate the components. Preferably the material and manufacturing produces a cost effective, aesthetic pleasing durable and reliable grate stacker product.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A grate stacker comprising:
   a bottom clamp assembly, including a first clamping plate, a second clamping plate, and a first mechanism urging the first clamping plate towards the second clamping plate; and
   an upper clamp assembly, including a third clamping plate, a fourth clamping plate, and a second mechanism urging the third clamping plate towards the fourth clamping plate; and
   an intermediate support assembly extending from the bottom clamp assembly to the upper clamp assembly, the intermediate support assembly maintaining the bottom clamp assembly spaced apart from the upper clamp assembly; and
   a first grilling grate comprised of a plurality of parallel spaced apart bars, and a second grilling grate comprised of a plurality of parallel spaced apart bars, portions of more than one of the plurality of spaced apart bars of the first grilling grate being retained between the first clamping plate and the second clamping plate, and portions of more than one of the plurality of spaced apart bars of the second grilling grate being retained between the third clamping plate and the fourth clamping plate.

2. The grate stacker according to claim 1, the first clamping plate being disposed below the second clamping plate and the third clamping plate being disposed below the fourth clamping plate.

3. The grate stacker according to claim 1, the first mechanism comprising a first screw extending through the first clamping plate and second clamping plate, and the second mechanism comprising a second screw extending through the third clamping plate and fourth clamping plate.

4. The grate stacker according to claim 2, the third clamping plate being pitched upwardly at an acute angle relative to horizontal.

5. The grate stacker according to claim 4, the acute angle being up to 15°.

6. The grate stacker according to claim 2, the third clamping plate including a base and a leading edge, the leading edge being pitched upwardly at an acute angle relative to horizontal.

7. The grate stacker according to claim 6, the acute angle being up to 15°.

8. The grate stacker according to claim 2, the third clamping plate including a base, a leading edge, and a shim, the shim extending upwardly at the leading edge.

9. The grate stacker according to claim 8, the shim extending upwardly up to 0.5 inches.

10. The grate stacker according to claim 2, the intermediate support including a top intermediate support and a bottom intermediate support, the top intermediate support being rotatable relative to the bottom intermediate support.

11. The grate stacker according to claim 2, the intermediate support comprising a rod with external threads and a sleeve with internal threads, a portion of the rod being threadedly received in the sleeve.

12. A pair of stacked grates in a grill,
the grill including a compartment containing the pair of stacked grates; and
the pair of stacked grates including an upper grate and a lower grate, and a grate stacker supporting the upper grate above the lower grate, the grate stacker comprising:
a bottom clamp assembly, including a first clamping plate, a second clamping plate, and a first mechanism urging the first clamping plate towards the second clamping plate, the first clamping plate being disposed below the second clamping plate; and
an upper clamp assembly, including a third clamping plate, a fourth clamping plate, and a second mechanism urging the third clamping plate towards the fourth clamping plate, the third clamping plate being disposed below the fourth clamping plate; and
an intermediate support assembly extending from the bottom clamp assembly to the upper clamp assembly, the intermediate support assembly maintaining the bottom clamp assembly spaced apart from the upper clamp assembly.

13. The pair of stacked grates in a grill according to claim 12, the first mechanism comprising a first screw extending through the first clamping plate and second clamping plate, and the second mechanism comprising a second screw extending through the third clamping plate and fourth clamping plate.

14. The pair of stacked grates in a grill according to claim 12, the third clamping plate being pitched upwardly at an acute angle relative to horizontal, the acute angle being up to 15°.

15. The pair of stacked grates in a grill according to claim 12, the third clamping plate including a base and a leading edge, the leading edge being pitched upwardly at an acute angle relative to horizontal, the acute angle being up to 15°.

16. The pair of stacked grates in a grill according to claim 12, the third clamping plate including a base, a leading edge, and a shim, the shim extending upwardly at the leading edge.

17. The pair of stacked grates in a grill according to claim 16, the shim extending upwardly up to 0.5 inches.

18. The pair of stacked grates in a grill according to claim 12, the intermediate support including a top intermediate support and a bottom intermediate support, the top intermediate support being rotatable relative to the bottom intermediate support.

19. The pair of stacked grates in a grill according to claim 12, the intermediate support including a top intermediate support rod and a bottom intermediate support sleeve, a portion of the top intermediate support rod being received in the bottom intermediate support sleeve, and the top intermediate support rod being rotatable relative to the bottom intermediate support sleeve.

20. The pair of stacked grates in a grill according to claim 12, the intermediate support comprising a rod with external threads and a sleeve with internal threads, a portion of the rod being threadedly received in the sleeve.

* * * * *